United States Patent
Erwin et al.

[19]

[11] Patent Number: 5,806,758

[45] Date of Patent: Sep. 15, 1998

[54] PROCESS FOR MANUFACTURING FOAM-FILLED PLASTIC MAILBOX POST

[75] Inventors: Ronald Dean Erwin, Fayetteville; Marvin Ray Whitley, Norcross, both of Ga.

[73] Assignee: Erwin Industries, Inc., Peachtree City, Ga.

[21] Appl. No.: 609,984

[22] Filed: Feb. 29, 1996

Related U.S. Application Data

[62] Division of Ser. No. 547,324, Oct. 24, 1995, Pat. No. 5,620,136.

[51] Int. Cl.$^6$ ................................................. B65D 91/00
[52] U.S. Cl. ............................................................. 232/39
[58] Field of Search ........................ 232/17, 39; D99/32, D99/31, 29; 264/46.5, 46.6, 46.7

[56] References Cited

U.S. PATENT DOCUMENTS

| D. 70,163 | 5/1926 | Dobbins . | |
| D. 172,997 | 9/1954 | Stallings . | |
| D. 182,607 | 4/1958 | Loewenstein | D99/32 |
| D. 194,895 | 3/1963 | Bardos | D99/32 |
| D. 197,683 | 3/1964 | Kusel | D74/9 |
| D. 199,107 | 9/1964 | Kusel | D74/9 |
| D. 200,748 | 3/1965 | Taylor | D74/9 |
| D. 254,755 | 4/1980 | Mortensen et al. | D99/32 |
| D. 291,937 | 9/1987 | Fisher | D99/30 |
| D. 338,762 | 8/1993 | Nichols | D99/32 |
| D. 344,272 | 2/1994 | Gaines | D99/32 |
| 1,590,725 | 6/1926 | Coates | 232/39 X |
| 3,405,026 | 10/1968 | Roberts | 264/46.7 X |
| 3,699,714 | 10/1972 | Johnson et al. | 264/46.7 X |
| 3,957,250 | 5/1976 | Murphy | 256/19 |
| 3,971,837 | 7/1976 | Hasegawa et al. | 264/46.7 X |
| 4,509,675 | 4/1985 | Siff et al. | 232/39 X |
| 4,540,160 | 9/1985 | Zanavich et al. | 256/19 |
| 4,602,765 | 7/1986 | Loper et al. | 256/19 |
| 4,709,853 | 12/1987 | Hahn | 232/39 |
| 4,891,081 | 1/1990 | Takahashi et al. | 264/46.7 X |
| 4,915,293 | 4/1990 | Paramski | 232/39 |
| 5,022,618 | 6/1991 | Barrett et al. | 232/39 X |
| 5,078,367 | 1/1992 | Simpson et al. | 256/24 |
| 5,215,290 | 6/1993 | Khalessi | 256/19 |
| 5,421,556 | 6/1995 | Dodge et al. | 256/1 |
| 5,478,136 | 12/1995 | Takeuchi et al. | 264/46.7 X |

*Primary Examiner*—Jerry Redman
*Attorney, Agent, or Firm*—Arthur A. Gardner & Associates, PC

[57] ABSTRACT

A mailbox support post for supporting a mailbox a predetermined distance above the ground, and including a ground engaging portion, an upright portion, a mailbox support shelf extending outward from the upright portion, and a brace between the mailbox support shelf and the upright portion. The mailbox support post is fabricated of an expanded foam core within a solid plastic shell.

4 Claims, 4 Drawing Sheets

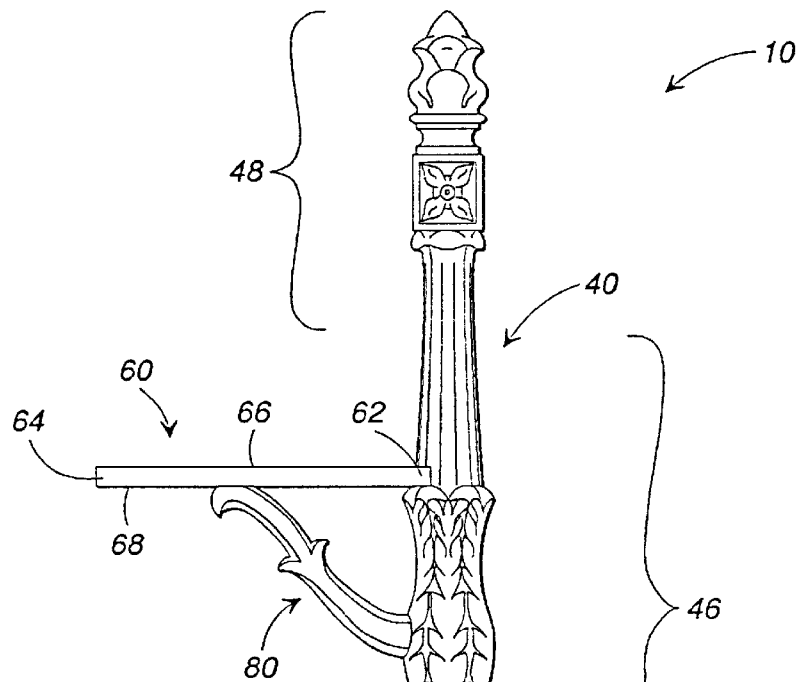
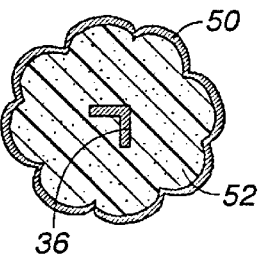
FIG. 1B
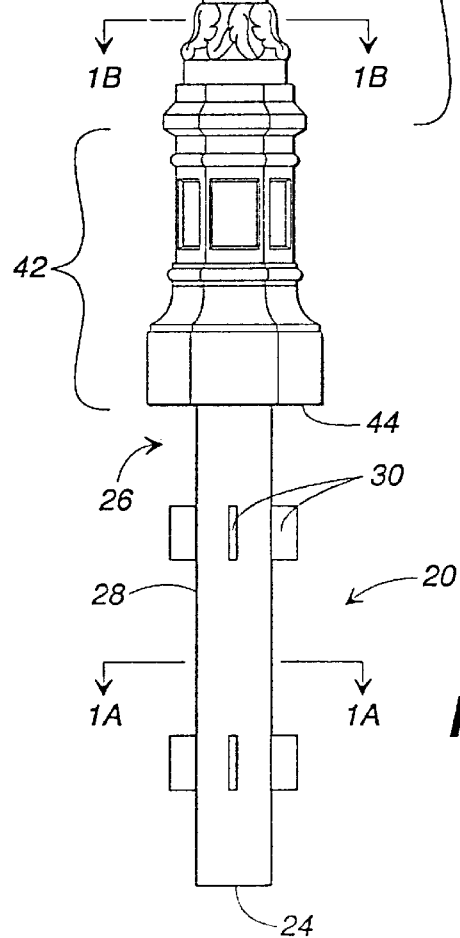
FIG. 1A
FIG. 1

PROCESS FOR MANUFACTURING FOAM-FILLED PLASTIC MAILBOX POST

This application is a division of Ser. No. 08/547,324, now U.S. Pat. No. 5,600,136, filed Oct. 24, 1995.

FIELD OF THE INVENTION

The present invention relates generally to an upright post to be installed in the ground for supporting a residential mailbox a convenient distance above ground level; and more specifically, to such a post having an outer shell of solid weather-proof urethane surrounding an expanded foam core.

BACKGROUND OF THE INVENTION

In rural and suburban areas, mail is typically delivered to homes and businesses by postal service employees who deposit the mail in mailboxes placed along the roadways near the business or residence. These mailboxes are generally of a common design, and are supported a distance above the ground to enable convenient deposit and retrieval of packages and mail therein.

A wide variety of posts for supporting mailboxes above the ground are known. Most simply, a wooden post or a metal pipe, having one end thereof buried in the ground may serve as a mailbox support post. It has been found desirable however, to provide mailbox support posts of improved functionality and aesthetic appeal.

For example, U.S. Pat. No. 4,709,853 to a discloses an adjustable platform means for supporting mailboxes and the like. Hahn describes an adjustable bracket for mounting on a vertical support for engaging mailboxes of different dimensions.

Additionally, a number of ornamental designs for mailbox posts are known. For example, U.S. Pat. Nos. Des. 70,163, Des. 172:997, Des. 197,683, Des. 199,107, Des. 200,748, Des. 254,755, Des. 334,272 and Des. 338.762 disclose a variety of ornamental mailbox designs and mailbox post designs.

Traditionally, mailbox posts have been fabricated from wood or metal. These materials of fabrication have been found lo have a number of disadvantages. For example, metal mailbox posts are commonly cast from iron, aluminum, or other metals and alloys, which raw materials are relatively expensive. Furthermore, these metals are subject to rusting and other corrosion, and are particularly subject to attack from acidic and alkaline soil. These metal posts often require expensive and time consuming periodic maintenance such as sanding, priming and painting.

Additionally, metal posts are heavy, thus adding to the expense of shipping and installation.

Known posts fabricated from wood, likewise, suffer a number of disadvantages. For example, wood posts are subject to weather and insect damage, warping, splintering and deterioration due to soil contact. Although lighter than many metals, wood posts are still relatively heavy, resulting in high shipping and installation costs. Furthermore, if it is desired to provide wood posts with decorative ornamentation through known woodworking techniques, the cost of manufacture is greatly increased.

Accordingly, it can be seen that there is yet a need in the art for a mailbox post which is easy and inexpensive to produce and install, which is light in weight, and which resists weather and insect damage. It is to the provision of such a mailbox post that the present invention is primarily directed.

SUMMARY OF THE INVENTION

Briefly described, in a preferred form the present invention comprises a mailbox post for supporting a mailbox a predetermined distance above the ground. The mailbox post is installed vertically, and has a lower ground-engaging portion for embedment Within the ground. The mailbox post also includes an upright portion which stands upright above the ground's surface. A mailbox support shelf extends horizontally outwardly from the upright portion of the mailbox post and is adapted to securely engage any of a variety of mailboxes of standard known design, and support the mailbox a predetermined distance above the ground. A diagonal brace is provided between the mailbox support shelf and the upright portion of the mailbox post to provide additional structural support. These elements form an integral unit having an expanded foam core surrounded by a solid, weather-resistant plastic outer shell. This construction provides an inexpensive and light-weight mailbox support post which is strong, rigid, and insect and weather resistant. In one preferred form, the present invention also includes an angle iron support embedded within the expanded foam core to provide even greater structural integrity. In another form a rigid metal pipe is imbedded within the upright position and extends out of the bottom thereof, replacing the plastic ground-engaging portion.

The mailbox post of the present invention is preferably fabricated by injection molding. The solid plastic outer shell is formed by coating a mold with a cladding of solid urethane to forming a hollow shell. The angle iron reinforcement is then inserted into the interior of this hollow shell. Liquid foam material is then injected into the hollow shell within the mold and the liquid foam expands to fill the hollow outer shell, thereby forming the expanded foam core.

Accordingly, it is a primary object of the present invention to provide a lightweight mailbox support post which is strong and durable and which is simple and economical to fabricate and install.

It is another object of the present invention to provide a mailbox support post which is rust and corrosion resistant, which will not warp or splinter, and which resists weather and insect damage.

It is another object of the present invention to provide a mailbox support post which is aesthetically pleasing, and which is readily paintable.

These and other objects, advantages, and features of the invention will become more apparent upon reading the following specification in conjunction with the accompanying drawing figures.

BRIEF DESCRIPTION OF THE DRAWING FIGURES

FIG. 1 is a side view of a first preferred embodiment of the mailbox support post according to the present invention.

FIG. 1A is a cross-sectional view of the ground-engaging portion of the mailbox support post shovel by FIG. 1, taken along lines A—A.

FIG. 1B is a cross-sectional view of the upright portion of the mailbox support post of FIG. 1, taken along lines B—B.

DETAILED DESCRIPTION OF THE PREFERRED EMBODIMENT

Figure 2:
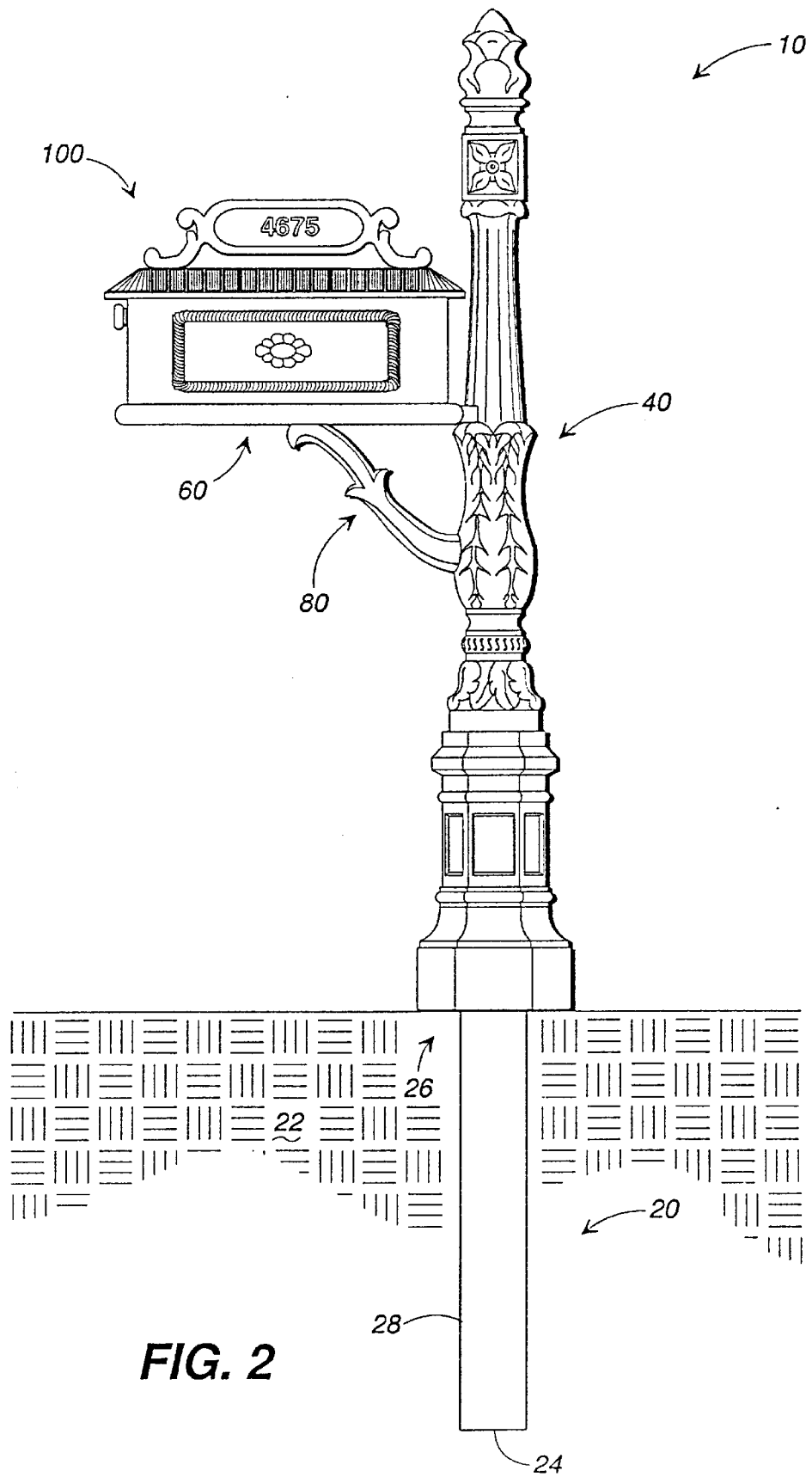
FIG. 2 is a side view of the mailbox support post of FIG. 1 shown installed in the ground and having a mailbox attached thereto.
Figure 3:
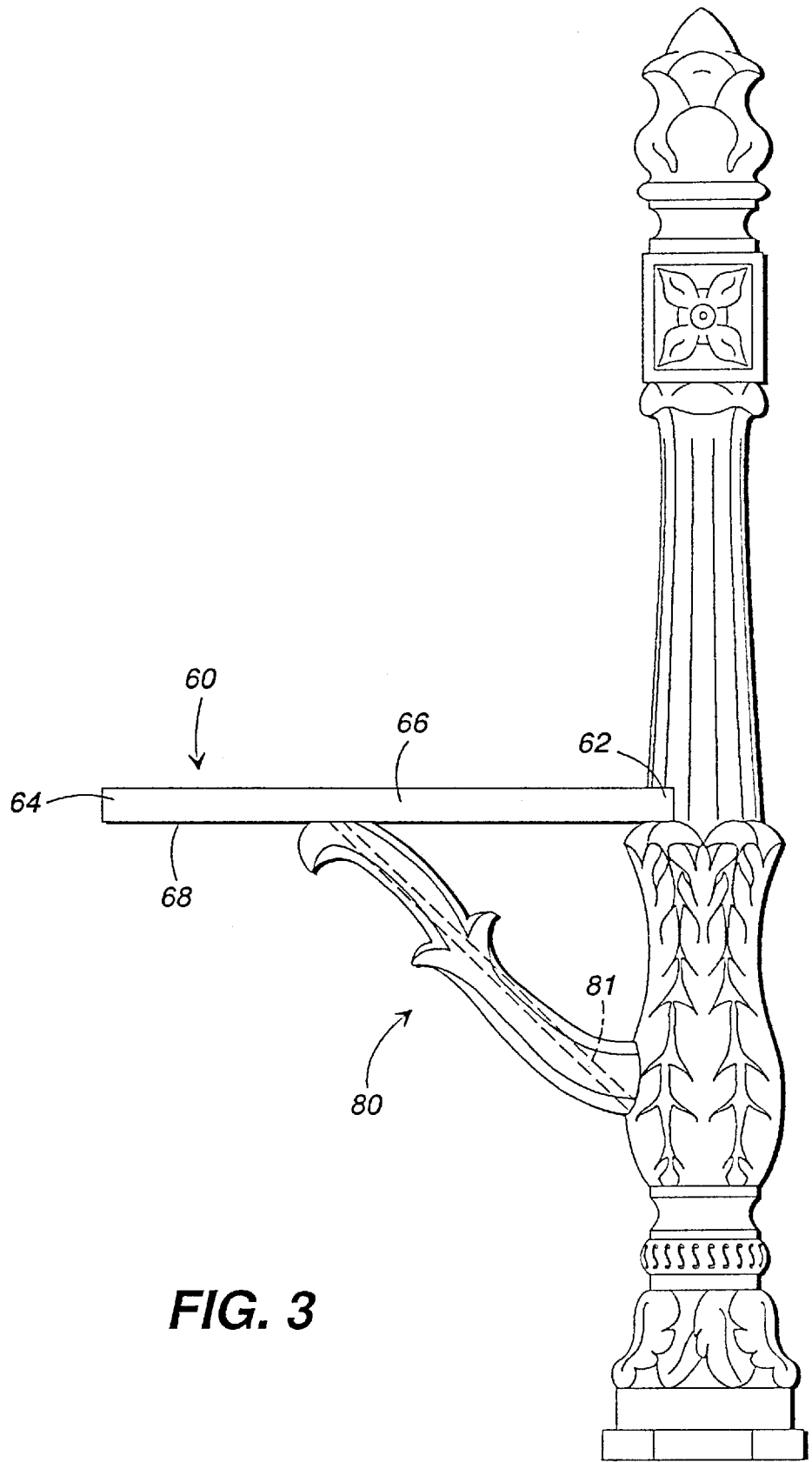
FIG. 3 is an enlarged side view of a portion of the mailbox support post of FIG.

Referring now in detail to the drawing figures, in which like reference numerals represent like parts throughout, FIG. 1 shows a mailbox support post 10 according to a preferred form of the present invention. Mailbox support post 10 generally comprises a lower ground engaging portion 20, an upright portion 40, a mailbox support shelf 60, and a diagonal brace 80. As shown in FIG. 2, when in use, mailbox support post 10 is erected vertically, with ground engaging portion 20 embedded within the ground 22, and having a mailbox 100 securely attached to the mailbox support shelf 60.

Lower ground-engaging portion 20 is adapted to be buried in the ground 22 when mailbox support post 10 is installed. Concrete or gravel can be installed around ground-engaging portion 20 to more securely affix mailbox support post 10 to the ground 22, as desired. Ground-engaging portion 20 further comprises a bottom 24, a top portion 26, and a cylindrical side portion 28. The ground-engaging portion 20 is shown as round in cross-section, but alternatively can be of square or other cross-sections. External outwardly projecting fins or projections 30 can be provided for preventing post 10 from twisting within the ground 22.

As shown by the cross-sectional detail of FIG. 1A, the ground-engaging portion 20 comprises an outer plastic shell 32 surrounding a foam core 34, and is fabricated according to the process described below. Most preferably, a reinforcing element 36 is provided within the foam core 34, and extends substantially throughout the length of the mailbox support post 10. Reinforcing element 36 is preferably of angle iron stock having a ⅞"×⅞₁"×0.105" profile, but alternatively, may be of any construction which will provide mailbox support post 10 with improved stiffness and vandal-resistance.

The top 26 of the ground-engaging portion 20 is integrally formed with lower section 42 of the upright portion 40 as a unitary structure. Upright portion 40 generally comprises a lower section 42, a medial section 46, and a top section 48. Lower section 42 is preferably of substantially greater diameter or width than the top 26 of the ground-engaging portion 20, thereby forming a base 44. Base 44 rests on the ground surface 22 when mailbox support post 10 is installed. Base 44 provides additional support against lateral deflection of the mailbox support post 10, and acts as a "stop" to prevent mailbox support post 10 from sinking further into the ground after installation.

As shown by the cross-sectional detail of FIG. 1B, the upright portion 40 also comprises an outer plastic shell 50 surrounding a foam core 52. As discussed above, reinforcing element 36 is provided within the foam core 52, throughout substantially the entire length of the ground-engaging portion 20 and the upright portion 40 of the post, preferably at least as far as the top section 48.

Figure 4:
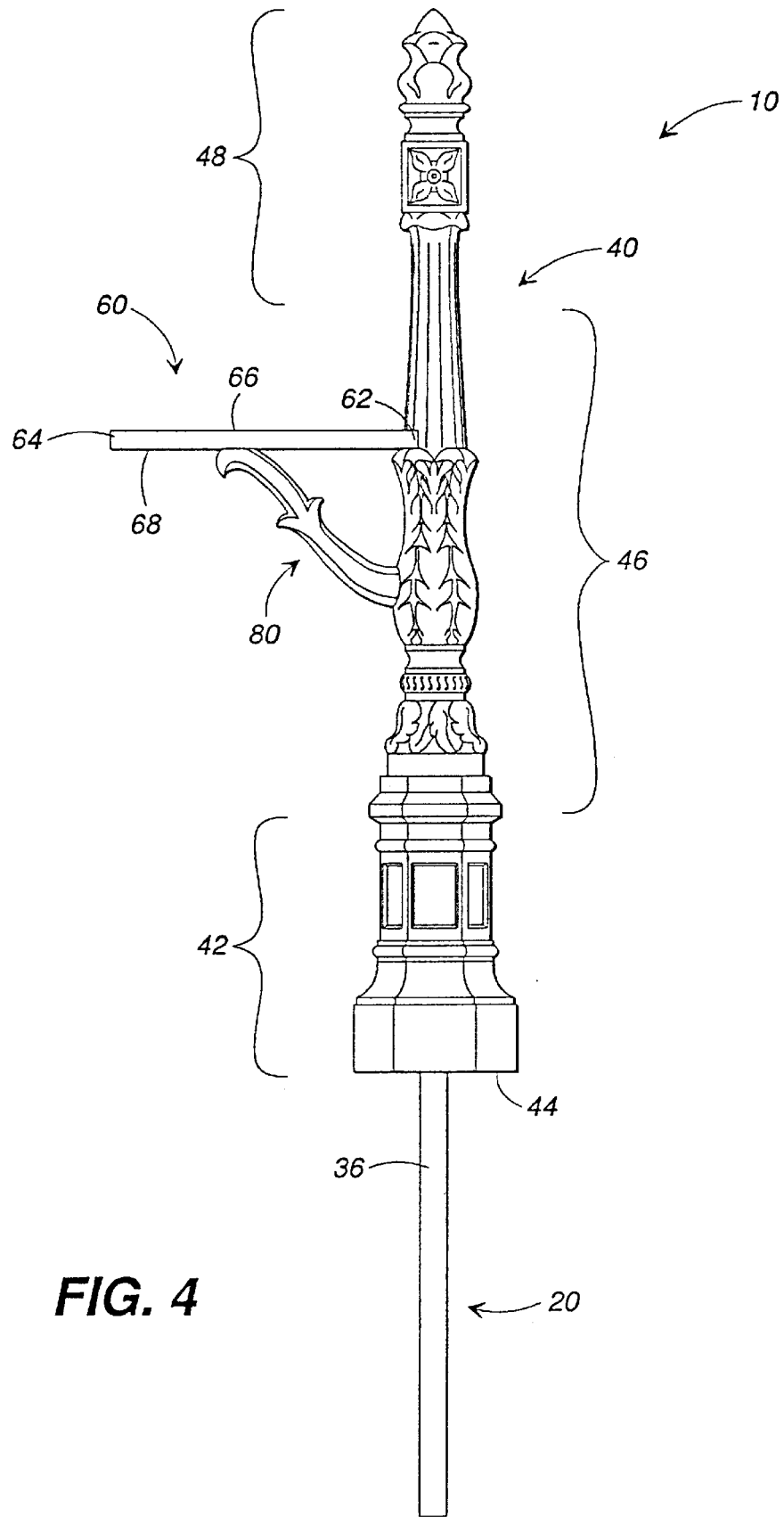
FIG. 4 is a side view of a second preferred embodiment of the mailbox support post of the present invention.

In an alternative embodiment, reinforcing element 36 can serve also as the lower ground-engaging portion 20 as shown by FIG. 4. In this embodiment, reinforcing element 36 is preferably a 1¼ diameter metal pipe. The reinforcing element 36 extends through substantially the entire length of the upright portion 40 and projects downwardly from the base 44 a distance sufficient to anchor the post 10 in the ground 22. Because reinforcing element 36 is directly exposed to the ground 22 in this alterative embodiment, corrosion is a concern. Therefore, reinforcing element 36 is fabricated from rust resistant material, such as galvanized steel, aluminum, or stainless steel.

Extending horizontally outwardly from, and integrally connected to, the medial section 46 of upright portion 40 is a mailbox support shelf or lateral support member 60. Mailbox support shelf 60 is preferably a flat, rectangular element having a proximal end 62, a distal end 64, a top surface 66 and a bottom surface 68. Top surface 66 is adapted to receive and securely engage a mailbox 100. FIG. 2 shows an ornamental mailbox 100 mounted on mailbox support shelf 60. It will be readily apparent to those of ordinary, skill in the art, however, that an), of a variety of standard mailbox designs can also be supported by the mailbox support post 10 of the present invention. Mailbox support shelf 60 can be provided with brackets, clips, holes, threaded openings, or other attachment means for securing the mailbox 100 thereto.

Extending between the medial section 46 of upright portion 40 and the mailbox support shelf 60 is a diagonal brace 80. Brace 80 can be an elongated element as shores by FIGS. 1 and 2, or alternatively, may comprise a planar element forming a rib or fin between the upright portion 40 and the mailbox support shelf 60. A steel reinforcing rod 81 can be provided within brace 80 for increased structural support. The outer surface of the brace 80 can be provided with decorative ornamentation to complement the appearance of the upright portion 40 and the mailbox 100.

The mailbox support post 10 of the present invention preferably comprises a high-density, rigid polyurethane foam core having a thin solid urethane outer shell. Alternatively, the post may be fabricated from other expanded foam materials such as polyethylene, polystyrene, or polyurethane; likewise, the outer shell may be acrylic, polyvinylchloride (PVC), ABS, or other solid, weatherproof plastics. Urethane is a preferred material as the outer shell, as it provides good paintability. Ground-engazing portion 20, upright portion 40, mailbox support shelf 60, and brace 80 are preferably integrally formed with one another, according to the injection molding process described below, to provide a more durable and rigid mailbox support post 10.

The mailbox support post 10 of the present invention is preferably fabricated as an integral unit by injection molding. A mold is first constructed by standard, known techniques. The mold is then coated with a cladding of urethane or other plastic, Which is cooled to solidify and form the thin outer plastic shell.

The reinforcing element 36 can then be installed in the hollow outer plastic shell, Within the ground engaging portion 20 and the upright portion 40. If desired, a reinforcing rod 81 can also be installed within the brace 80 between mailbox support shelf 60 and the upright portion 40. Increased strength may be achieved if the reinforcing rod is installed with its lower end bearing on reinforcing element 36.

The hollow outer plastic shell is then half filled with a liquid, expandable foam material, whereupon the liquid foam expands to fill the outer shell to form the foam core. It may be desirable to inject the foam material into the outer shell before the outer shell has completely cooled, thereby providing increased bonding between the foam core and the outer shell to provide a final product of improved rigidity. The mailbox support post 10 is removed from the mold using standard known techniques, and finished and painted as necessary.

The above-described alternative embodiment, wherein the reinforcing element 36 also serves as the ground-engaging portion 20, is fabricated in essentially the same manner, with some changes. The mold which is coated with a plastic cladding will not include the ground engaging portion 20. Rather, the hollow outer plastic shell will comprise only that portion of post 10 from base 44 to top section 48. The reinforcing element 36 is installed within upright portion 40, and projecting downwardly from base 44. The shell is then filled with foam as described above, and the same finishing processes can be carried out.

While the present invention has been described in its preferred forms, it will be apparent to those skilled in the art that modifications, additions, and deletions can be made therein without departing from the spirit and scope of the invention as set forth in the following claims.

What is claimed is:

1. A process for fabricating a composite mailbox support post using a mold, the process comprising the steps of:

a. lining the mold with a plastic cladding to form a hollow molded plastic shell the shell having a diagonal brace portion;

b. placing a rigid metal reinforcing element within the diagonal brace portion of the hollow shell;

c. injecting a liquid, expandable foam material into the hollow shell to form the composite mailbox support post comprising an inner rigid metal reinforcing element, expanded foam surrounding the rigid metal reinforcing element, and a hard plastic cladding surrounding the expanded foam; and d. removing the composite mailbox support post from the mold.

2. The process of claim 1 wherein the composite plastic cladding comprises urethane.

3. The process of claim 1 wherein the foam material is polyurethane.

4. The process of claim 1 further comprising finishing and painting the mailbox post after removing it from the mold.

* * * * *